(12) United States Patent
Haghighat

(10) Patent No.: US 7,769,118 B2
(45) Date of Patent: Aug. 3, 2010

(54) METHOD AND APPARATUS FOR EQUALIZING RECEIVED SIGNALS BASED ON INDEPENDENT COMPONENT ANALYSIS

(75) Inventor: Afshin Haghighat, Ile-Bizard (CA)

(73) Assignee: InterDigital Technolgy Corporation, Wilmington, DE (US)

( * ) Notice: Subject to any disclaimer, the term of this patent is extended or adjusted under 35 U.S.C. 154(b) by 726 days.

(21) Appl. No.: 11/618,012

(22) Filed: Dec. 29, 2006

(65) Prior Publication Data

US 2007/0189427 A1 Aug. 16, 2007

Related U.S. Application Data

(60) Provisional application No. 60/772,479, filed on Feb. 10, 2006.

(51) Int. Cl.
  *H04B 1/10* (2006.01)
  *H04L 27/22* (2006.01)
(52) U.S. Cl. ............ 375/350; 375/332
(58) Field of Classification Search .......... 375/260, 375/262, 265, 267, 324, 329, 332, 340, 341, 375/346, 347, 350; 329/304
  See application file for complete search history.

(56) References Cited

U.S. PATENT DOCUMENTS

| | | | |
|---|---|---|---|
| 6,426,972 B1 * | 7/2002 | Endres et al. | 375/229 |
| 6,430,528 B1 * | 8/2002 | Jourjine et al. | 704/200 |
| 7,496,164 B1 * | 2/2009 | Mostafa | 375/346 |
| 2003/0204380 A1 * | 10/2003 | Dishman et al. | 702/189 |
| 2005/0018765 A1 * | 1/2005 | Endres et al. | 375/233 |
| 2005/0203981 A1 * | 9/2005 | Sawada et al. | 708/322 |
| 2006/0176939 A1 * | 8/2006 | Goldberg | 375/148 |
| 2006/0189280 A1 * | 8/2006 | Goldberg | 455/101 |
| 2008/0215651 A1 * | 9/2008 | Sawada et al. | 708/205 |
| 2009/0001262 A1 * | 1/2009 | Visser et al. | 250/282 |

OTHER PUBLICATIONS

Abidi et al., *Direct-Conversion Radio Transceivers for Digital Communications*, IEEE Journal of Solid-State Circuits, vol. 30, No. 12, pp. 1399-1410, (1995).

Dominique N. Godard, *Self-Recovering Equalization and Carrier Tracking in Two-Dimensional Data Communication Systems*, IEEE Transactions on Communications, vol. 28, No. 11, pp. 1867-1875, (Nov. 1980).

(Continued)

*Primary Examiner*—Young T. Tse
(74) *Attorney, Agent, or Firm*—Volpe and Koenig, P.C.

(57) ABSTRACT

The present invention is related to a method and apparatus for blindly equalizing received signals in the time domain based on independent component analysis (ICA). Received signals are demodulated and over-sampled by a rate at least twice the symbol rate to populate a mixing matrix. The received signal samples are cast into the form of a signal separation problem as represented by the multiplication of the mixing matrix with the transmitted symbols such that the unknowns can be solved by ICA. Applying ICA to the received signal samples provides a de-mixing matrix which can be multiplied by the received signal samples to estimate the transmitted symbol sequence. The proposed ICA-based equalization method simultaneously corrects other transmission imperfections, such as DC-offset, carrier phase offset and in-phase and quadrature imbalance, all in the time domain. As an alternative to over-sampling, multiple copies of the received signals are received via a plurality of antennas.

16 Claims, 4 Drawing Sheets

OTHER PUBLICATIONS

Hyvärinen et al, *Independent Component Analysis: A Tutorial*, Helsinki University of Technology, Laboratory of Computer and Information Science, (Finland Apr. 1999).

Hyvärinen et al., *Independent Component Analysis: Algorithms and Applications*, Neural Networks Research Centre, vol. 13, No. 4-5, pp. 411-430, (Finland 2000).

Jean-Francois Cardoso, *Blind Signal Separation: Statistical Principles*, Proceeding of the IEEE, vol. 9, No. 10, pp. 2009-2025, (Oct. 1998).

Johnson et al., *Blind Equalization Using the Constant Modulus Criterion: A Review*, Proceedings of the IEEE, vol. 86, No. 10, pp. 1927-1950, (Oct. 1998).

Mirabbasi et al., *Classical and Modern Receiver Architectures*, IEEE Communications Magazine, vol. 38, No. 11, pp. 132-139, (Nov. 2000).

Treichler et al., *Practical Blind Demodulators for High-Order QAM Signals*, Proceedings of the IEEE, vol. 86, No. 10, pp. 1907-1926, (Oct. 1998).

Valkama et al., *Advanced Receiver Architectures and I/Q Signal Processing*, IEEE International Symposium on Control, Communications and Signal Processing (ISCCSP) 2004, pp. 71-74, (2004).

Valkama et al., *Blind I/Q Signal Separation-Based Solutions for Receiver Signal Processing*, EURASIP Journal on Applied Signal Processing, vol. 2005, No. 16, (2005).

\* cited by examiner

METHOD AND APPARATUS FOR EQUALIZING RECEIVED SIGNALS BASED ON INDEPENDENT COMPONENT ANALYSIS

CROSS REFERENCE TO RELATED APPLICATIONS

This application claims priority from U.S. Provisional Patent Application No. 60/772,479 filed on Feb. 10, 2006 which is incorporated by reference as if fully set forth.

FIELD OF INVENTION

The present invention is related to communication systems. More particularly, the present invention is related to a method and apparatus for equalizing received signals based on independent component analysis (ICA).

BACKGROUND

Communication systems are well known in the art. Generally, such systems comprise communication stations, which transmit and receive communication signals between each other. In a communication system, an equalizer is commonly applied to a received signal to remove signal distortion caused in the channel. Equalization is especially useful in wireless communication systems where communication signals suffer distortion effects due to interfering transmissions in a shared wireless channel.

In its most basic form, equalization is a method for separating a desired signal from interfering signals. In addition to performing equalization, it is also desirable to correct other types of signal distortion that typically result from receiver imperfections. Some examples of signal distortions caused at the receiver include direct current (DC) offset, carrier phase offset and in-phase and quadrature signal imbalances in the case of quadrature amplitude modulation (QAM) schemes.

Methods for adapting a filter to counteract distortions in a received signal by exploiting statistical properties of the received data are generally referred to as blind equalization. Blind equalization is desirable for removing distortion from a received signal because it is more bandwidth efficient than equalization techniques that require a training sequence to be transmitted with the data stream.

Blind equalization using independent component analysis (ICA) in applying well-known ICA signal separation algorithms in a frequency domain has been proposed in the prior art. The prior art applications of ICA for blind equalization are based on correcting distortions resulting from receiver imperfections in the time domain while signal equalization is performed in the frequency domain. The inventors have recognized that one disadvantage of the prior art is that some imperfections, such as DC offset, are a result of coefficient truncation in the equalizer and therefore require a separate DC-offset remover following equalization.

The inventors have developed an ICA-based method for equalization in the time domain that enables equalization and compensation for receiver imperfections to be performed together, thus allowing ICA to correct all sources of signal distortion simultaneously and improving upon the inefficiencies of the prior art.

SUMMARY

The present invention is related to a method and apparatus for equalizing received signals according to independent component analysis (ICA). Signal equalization at a receiver is formulated as a signal separation problem, and is solved in the time domain using ICA. A mixing matrix for ICA is populated preferably by over-sampling received signals. In an alternate embodiment, multiple receive antennas may be used alone or in combination with over-sampling. The inventive ICA-based equalization method simultaneously corrects other transmission imperfections, such as DC-offset, carrier phase offset and in-phase and quadrature imbalance, all in the time domain.

BRIEF DESCRIPTION OF THE DRAWINGS

A more detailed understanding of the invention may be had from the following description of a preferred embodiment, given by way of example and to be understood in conjunction with the accompanying drawing(s) wherein:

FIG. 4B shows a 16-QAM signal constellation with interference and other imperfections removed by ICA processing in accordance with the present invention.

DETAILED DESCRIPTION OF THE PREFERRED EMBODIMENTS

Figure 1:
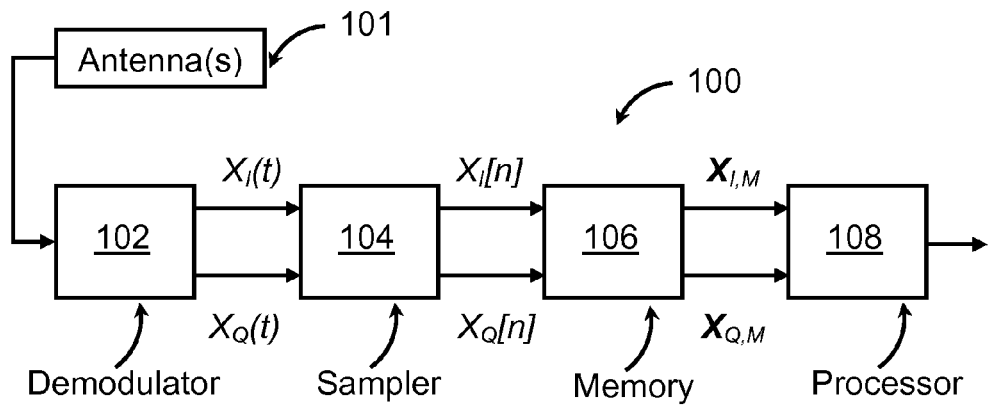
FIG. 1 is a block diagram of a quadrature amplitude modulation (QAM) receiver employing ICA-based equalization in accordance with the present invention.

The present invention is described with reference to the figures wherein like numerals represent like elements throughout. The present invention may be applied to any type of communication system, and in any component for receiving communication signals. In particular, the present invention may be included in wireless receivers to filter out signal distortions caused by interfering signals in the shared wireless medium and receiver imperfections.

Wireless systems typically include two types of communication stations: base stations and wireless transmit/receive units (WTRUs). When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The present invention discloses a technique and apparatus for blind receiver signal processing according to an independent component analysis (ICA) algorithm. Equalization is treated as a signal separation problem, because the desired received signal must be separated from interference terms. A mixing matrix for ICA is preferably populated by over-sampling of the received signal. In accordance with the present invention, ICA blindly equalizes received signals and simultaneously corrects other transmission imperfections, such as direct current (DC) offset, carrier phase offset, and in-phase (I) and quadrature (Q) imbalance. The present invention is explained with respect to a wireless communication system modulating signals according to quadrature amplitude modulation (QAM). However, the present invention may be applied in conjunction with any type of modulation scheme in both wired and wireless systems.

ICA for signal processing in a receiver is explained hereinafter in accordance with a preferred embodiment of the present invention. In a communication system using quadrature amplitude modulation (QAM), a transmitted baseband signal can be represented according to:

$$z(t) = z_I(t) + jz_Q(t) \quad \text{Equation (1)}$$

where j is $\sqrt{-1}$, and such that $$z_I(t) = i(t) * p(t)$$

$$z_Q(t) = q(t) * p(t) \quad \text{Equation (2)}$$

where p(t) is an impulse response of a transmitter pulse shaping filter. The signals i(t) and q(t) are statistically independent in-phase (I) and quadrature (Q) information streams defined by:

$$i(t) = \sum_m I_m \delta(t - mT) \quad \text{Equation (3)}$$

$$q(t) = \sum_m Q_m \delta(t - mT)$$

where T is a symbol time period, and $I_m$ and $Q_m$ represent an $m^{th}$ bit in the I and Q data streams, respectively. The transmitted signal (i.e. z(t) after carrier modulation) passes through the channel with an equivalent baseband impulse response given by:

$$h(t) = h_I(t) + jh_Q(t). \quad \text{Equation (4)}$$

During transmission, the transmitted signal acquires additive noise. Preferably, the ICA-based receiver uses a low pass filter prior to ICA processing which is a well-known technique to limit the out-band noise. Therefore, the preferred ICA-based method is directed to signal separation from interference terms without the additive noise term included. That is, the additive noise is in essence negligible since it can easily be dealt with using techniques well known in the art.

Referring to FIG. 1, a receiver 100 comprising an ICA-based blind equalizer processing component 108 in accordance with the present invention is illustrated. The receiver 100 preferably includes a QAM demodulator 102, a signal sampler 104 and a memory component 106.

Figure 2:
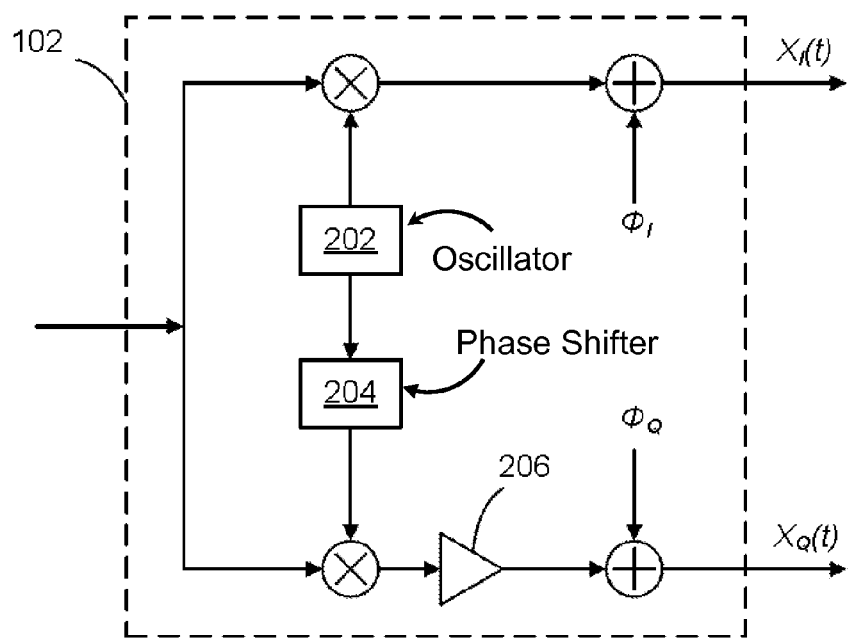
FIG. 2 is an example of a QAM demodulator circuit with demodulator imperfections shown explicitly.

As best seen in FIG. 2, a preferred QAM demodulator 102 is configured to demodulate a received signal and produce in-phase (I) and quadrature (Q) component signals. An oscillator 202 is provided to produce a demodulating carrier signal for forming both the I and Q components of the received signal. Due to distortion, the frequency and phase of the local oscillator 202 may not be perfectly synchronized with the transmitter's oscillator resulting in a frequency offset $\Delta\omega$ and a phase offset $\Theta$. On the quadrature side, a phase shifter 204 applies a 90° phase shift to the sinusoid generated by the oscillator 202 to produce the quadrature carrier signal. Additionally, phase shifter 204 introduces a phase offset $\phi$ resulting in a phase imbalance between the demodulated I and Q signals.

FIG. 2 further illustrates the QAM demodulator 102 with several types of signal distortion that can affect the performance of the receiver explicitly represented by elements 206, $\Phi_I$ and $\Phi_Q$. The different paths taken by the I and Q signals may also introduce amplitude imbalance, which is represented by amplifier 206 which changes the amplitude of the Q signal by a factor of $\alpha$ relative to the I signal where $\alpha$ may be any value. $\Phi_I$ and $\Phi_Q$ represent a DC offset affecting the I signal and the Q signal, respectively. To summarize, the main sources of imperfection in a QAM receiver 100 include I/Q phase imbalance represented by $\phi$, I/Q amplitude imbalance represented by $\alpha$ and DC bias offsets represented by $\Phi_I$ and $\Phi_Q$, respectively. The parameters defining imperfections of the receiver as well as the carrier frequency offset $\Delta\omega$ and the carrier phase offset $\Theta$ are assumed unknown but fixed.

The resulting demodulated signal including the imperfections can be written according to:

$$\begin{bmatrix} x_I(t) \\ x_Q(t) \end{bmatrix} = \begin{bmatrix} \cos(\Delta\omega t + \Theta) & \sin(\Delta\omega t + \Theta) \\ -\alpha\sin(\Delta\omega t + \Theta + \phi) & \alpha\cos(\Delta\omega t + \Theta + \phi) \end{bmatrix} \times \quad \text{Equation (5)}$$

$$\left( \begin{bmatrix} h_I(t) & -h_Q(t) \\ h_Q(t) & h_I(t) \end{bmatrix} * \begin{bmatrix} z_I(t) \\ z_Q(t) \end{bmatrix} \right) + \begin{bmatrix} \Phi_I \\ \Phi_Q \end{bmatrix}.$$

By performing some basic mathematical operations and grouping the relevant terms, Equation (5) can be rewritten according to:

$$\begin{cases} x_I(t) = g^{II}(t) * i(t) + g^{QI}(t) * q(t) + \Phi_I \\ x_Q(t) = g^{IQ}(t) * i(t) + g^{QQ}(t) * q(t) + \Phi_Q \end{cases} \quad \text{Equation (6)}$$

where $$g^{II}(t) = (\cos(\Delta\omega t + \Theta)h_I(t) + \sin(\Delta\omega t + \Theta)h_Q(t)) * p(t) \quad \text{Equation (7)}$$

$$g^{QI}(t) = (\sin(\Delta\omega t + \Theta)h_I(t) - \cos(\Delta\omega t + \Theta)h_Q(t)) * p(t)$$

$$g^{IQ}(t) = (-\alpha\sin(\Delta\omega t + \Theta + \phi)h_I(t) + \alpha\cos(\Delta\omega t + \Theta + \phi)h_Q(t)) * p(t)$$

$$g^{QQ}(t) = (\alpha\cos(\Delta\omega t + \Theta + \phi)h_I(t) - \alpha\sin(\Delta\omega t + \Theta + \phi)h_Q(t)) * p(t).$$

The above defined $g^{xy}(t)$ functions (such that xy equals II, QI, IQ, QQ) represent the accumulated effect of the pulse shaping at the transmitter p(t), the channel response h(t) and the receiver imperfections defined above. As Equation (6) indicates, the problem of signal reconstruction has been translated into a problem of signal separation from combined linear and convolutive mixtures.

Referring to FIG. 1, following down-conversion (i.e. demodulation), the sampler 104 preferably samples the demodulated I and Q signals $x_I(t)$ and $x_Q(t)$ at a rate of M/T resulting in sampled signals $$x_I[n] = x_I\left(k\frac{T}{M}\right) \text{ and } x_Q[n] = x_Q\left(k\frac{T}{M}\right).$$

Due to transmitter pulse-shaping, such as Root-Raised-Cosine (RRC) filtering, as well as the limited transmission bandwidth of the channel, the received waveform contains memory that manifests itself as inter-symbol interference (ISI) at the receiver. Accordingly, each received symbol contains information about previous and future symbols as a result of ISI. Assuming that the ISI is symmetric, the memory length of the $g^{xy}(t)$ functions in terms of number of interfering symbols is equal to 2L+1 where L>0. Accordingly, the I and Q sampled signals can be written according to:

$$x_I[n] = \sum_{m=-L}^{L} I_m g_m^{II}[n - mT] + \sum_{m=-L}^{L} Q_m g_m^{QI}[n - mT] + \Phi_I \quad \text{Equation (8)}$$

-continued $$x_Q[n] = \sum_{m=-L}^{L} I_m g_m^{IQ}[n-mT] + \sum_{m=-L}^{L} Q_m g_m^{QQ}[n-mT] + \Phi_Q$$

or, equivalently in vector form according to:

$$\begin{bmatrix} x_I(n) \\ x_Q(n) \end{bmatrix} = \begin{bmatrix} g_n^{II^T} & g_n^{QI^T} \\ g_n^{IQ^T} & g_n^{QQ^T} \end{bmatrix} \begin{bmatrix} i_L \\ q_L \end{bmatrix} + \begin{bmatrix} \Phi_I \\ \Phi_Q \end{bmatrix} \quad \text{Equation (9)}$$

where $$g_n^{II^T} = [g_{n,-L}^{II} \cdots g_{n,-1}^{II} g_{n,0}^{II} g_{n,1}^{II} \cdots g_{n,L}^{II}] \quad \text{Equation (10)}$$

$$i_L^T = [I_{-L} \cdots I_{-1} I_0 I_1 \cdots I_L] \quad \text{Equation (11)}$$

such that vectors $g_n^{IQ}, g_n^{QI}, g_n^{QQ}$ and $q_L$ are defined similarly. In the following, a matrix made up of the vectors $g_n^{IQ}$, $g_n^{QI}, g_n^{QQ}$ and $g_n^{II^T}$ in Equation (9) is referred to as a mixing matrix. According to the present invention, vectors $i_L$ and $q_L$ contain independent components as a result of the bits in the transmitted bit stream being statistically independent. In Equation (9), the fact that the value $I_k$ during the reception of a current symbol is equal to the value $I_{k+1}$ during the reception of the previous symbol does not violate the independence of the components within a single symbol reception interval. Thus, the problem can be viewed as a linear mix problem containing independent components of type $I_k$ and $Q_k$.

The problem presented in Equation (9) cannot be solved for the desired vectors $i_L$ and $q_L$ in its current form because it has only two mixtures to estimate the 2×(2L+1) independent components. A preferred solution is to provide more samples to populate the mixing matrix. In accordance with a preferred embodiment of the present invention, the sampler 104 over-samples the received signals to sufficiently populate the mixing matrix. The over-sampling ratio M is preferably an integer value greater than 1.

Preferably, over-sampling is achieved by configuring the sampler 104 to sample each of the I and Q data streams at a rate of at least twice the symbol rate of the transmitted signal. As an alternative, receiver 100 may include a plurality of antennas 101 to provide a plurality of received signals to the demodulator 102 which in turn would then be configured to produce I and Q components of the signal from each antenna. Sampler 104 could then sample each I component and Q component at the symbol rate of the transmitted signal to effectively provide sufficient samples to populate the mixing matrix. Even more samples can be provided utilizing a combination of providing a plurality of received signals from different antennas with sampling at a multiple greater than 1 of the transmitted symbol rate.

The multi-antenna alternative is particularly desirable in a receiver equipped with multiple antennas for other reasons, for example in the case of a multi-input multi-ouput (MIMO) receiver. Otherwise, providing a receiver with multiple antennas and duplicative demodulation circuitry may be substantially more complex and costly to implement than simply utilizing the sampler 104 as a sampling device that samples at a higher rate.

A memory or buffer component 106 is configured to receive and store the samples from the sampler 104 and to permit the ICA processor component 108 to selectively populate the mixing matrix as described below.

Since each received symbol contains information about previous and future symbols due to ISI, it is desirable to exploit this information at the receiver. Assuming that the length of memory in the received signal is approximately equal to 2L+1, the over-sampling ratio, M, is preferably chosen to be equal to (2L+1), however, M may be any integer value greater than 1. Although all M samples may belong to only one symbol, each sample provides some information about that symbol that is different from the other samples because ISI is not constant. Alternatively, if the effective channel memory is approximately equal to an even multiple of the symbol rate 2L, then preferably sampling is done at a rate of 2L for which preferably groups of 2L samples of each of the I and Q demodulated signals are used to populate the mixing matrix.

The memory component 106 accumulates the M samples of each of the I and Q signals into vectors $X_{I,M}$ and $X_{Q,M}$, and provides them to the ICA processing component 108. ICA processor 108 stacks all M samples of each of the I and Q signals to populate the mixing matrix, as shown in Equation (12). Because of over-sampling, there are a sufficient number of mixtures such that the signal separation problem shown in Equation (12) can be solved by an ICA signal separation algorithm in the processor 108.

$$\begin{bmatrix} x_I[n] \\ \vdots \\ x_I[n+M-1] \\ x_Q[n] \\ \vdots \\ x_Q[n+M-1] \end{bmatrix} = \quad \text{Equation (12)}$$

$$\begin{bmatrix} g_{n,-L}^{II} & \cdots & g_{n,0}^{II} & \cdots & g_{n,L}^{II} & g_{n,0}^{QI} & \cdots & g_{n,-L}^{QI} & \cdots & g_{n,-L}^{QI} \\ \cdots & \cdots & \cdots & \cdots & \cdots & \cdots & \cdots & \cdots & \cdots & \cdots \\ g_{n+M-1,-L}^{II} & \cdots & g_{n+M-1,0}^{II} & \cdots & g_{n+M-1,L}^{II} & g_{n+M-1,0}^{QI} & \cdots & g_{n+M-1,-L}^{QI} & \cdots & g_{n+M-1,-L}^{QI} \\ g_{n,-L}^{IQ} & \cdots & g_{n,0}^{IQ} & \cdots & g_{n,L}^{IQ} & g_{n,0}^{QQ} & \cdots & g_{n,-L}^{QQ} & \cdots & g_{n,-L}^{QQ} \\ \cdots & \cdots & \cdots & \cdots & \cdots & \cdots & \cdots & \cdots & \cdots & \cdots \\ g_{n+M-1,-L}^{IQ} & \cdots & g_{n+M-1,0}^{IQ} & \cdots & g_{n+M-1,L}^{IQ} & g_{n+M-1,0}^{QQ} & \cdots & g_{n+M-1,-L}^{QQ} & \cdots & g_{n+M-1,-L}^{QQ} \end{bmatrix}$$

$$\begin{bmatrix} I_{-L} \\ \vdots \\ I_0 \\ \vdots \\ I_L \\ Q_{-L} \\ \vdots \\ Q_0 \\ \vdots \\ Q_L \end{bmatrix} + \begin{bmatrix} \Phi_I \\ \vdots \\ \Phi_I \\ \vdots \\ \Phi_I \\ \Phi_Q \\ \vdots \\ \Phi_Q \\ \vdots \\ \Phi_Q \end{bmatrix}.$$

The mixing matrix of Equations (12) is a full rank matrix since each row is related to a different sampling point in time. This condition is preserved as long as the I and Q data streams are not deterministic sequences.

ICA, applied by the ICA processor component 108 to a series of received signal samples, provides a de-mixing matrix W as an approximation of the inverse of the mixing matrix of Equation (12), as described further below. The de-mixing matrix, also commonly referred to as the unmixing or separating matrix, is used to estimate the transmitted symbols. ICA may also approximate the mixing matrix of Equation (12), however, the de-mixing matrix is what is used to recover the transmitted symbols.

The ICA processor 108 also removes any mean offset as part of the pre-processing of the I an Q signal samples from the memory component 106 because the mean is a deterministic component of the mixture. The DC removal process for the I and Q samples is done separately. Accordingly, the DC offset terms $\Phi_I$ and $\Phi_Q$ in Equation (12) are not required in using ICA. Thus, the unwanted DC offset is effectively eliminated. Accordingly, Equation (12) is simplified according to:

$$\begin{bmatrix} x_I[n] \\ \vdots \\ x_I[n+M-1] \\ x_Q[n] \\ \vdots \\ x_Q[n+M-1] \end{bmatrix} = \begin{bmatrix} g_n^{II^T} & g_n^{QI^T} \\ \vdots & \vdots \\ g_{n+M-1}^{II^T} & g_{n+M-1}^{QI^T} \\ g_n^{IQ^T} & g_n^{QQ^T} \\ \vdots & \vdots \\ g_{n+M-1}^{IQ^T} & g_{n+M-1}^{QQ^T} \end{bmatrix} \begin{bmatrix} i_L \\ q_L \end{bmatrix}. \quad \text{Equation (13a)}$$

Applying ICA, such as the well known Fast-ICA algorithm $F_{FastICA}$, to the M samples of each of the I and Q components of each of a selected number Y of received symbols, as stored in memory component 106, provides the de-mixing matrix W that is used to recover the transmitted symbols preferably as:

$$W = F_{FastICA}\left( \begin{bmatrix} x_I[n_1] \\ \vdots \\ x_I[n_1+M-1] \\ x_Q[n_1] \\ \vdots \\ x_Q[n_1+M-1] \end{bmatrix}, \ldots, \begin{bmatrix} x_I[n_Y] \\ \vdots \\ x_I[n_Y+M-1] \\ x_Q[n_Y] \\ \vdots \\ x_Q[n_Y+M-1] \end{bmatrix} \right). \quad \text{Equation (13b)}$$

Figure 3A:
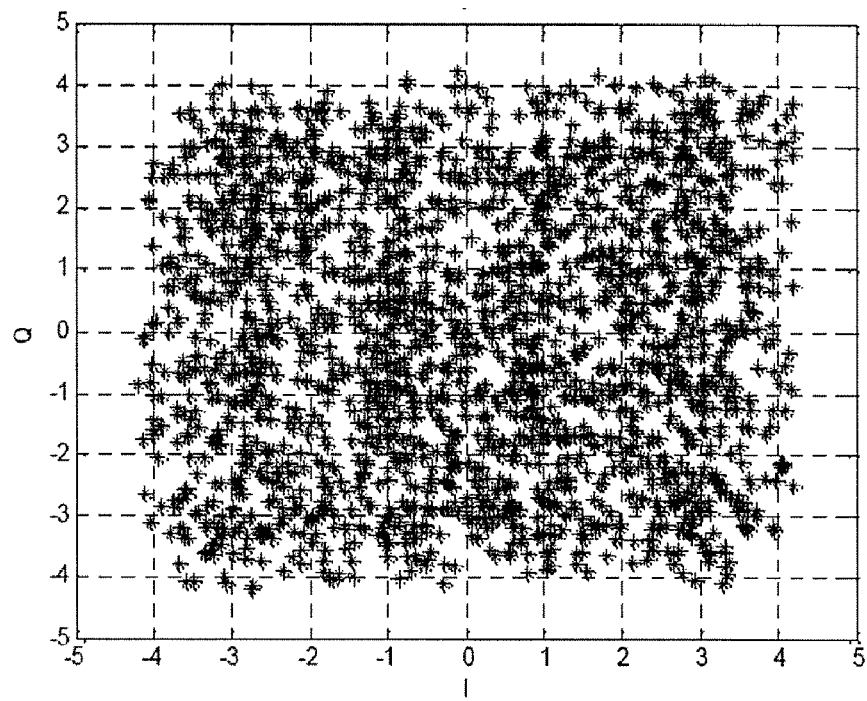
FIG. 3A shows a 16-QAM signal constellation prior to ICA processing.
Figure 3B:
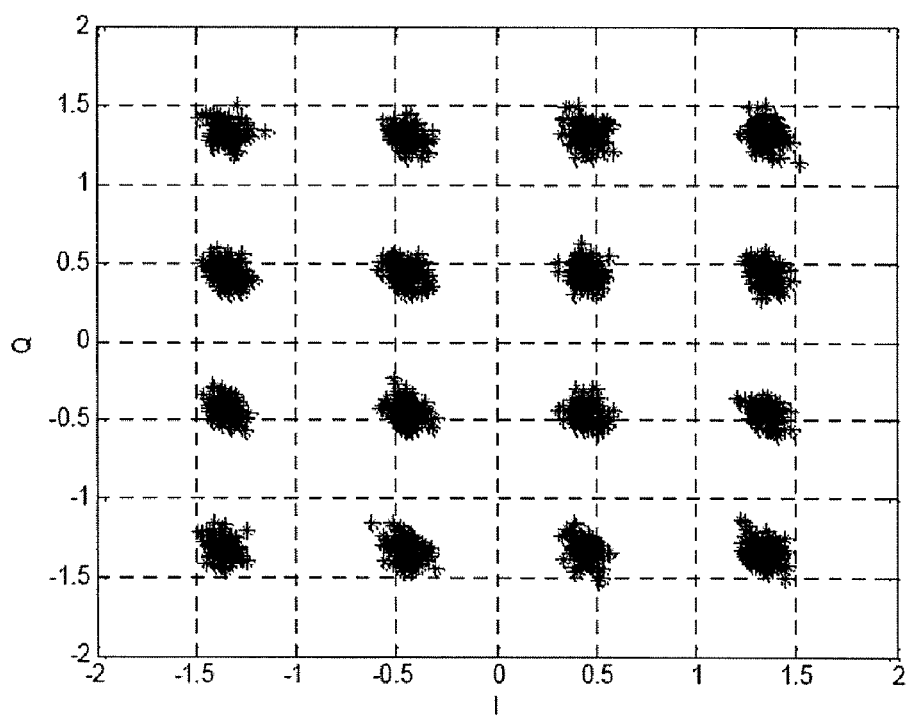
FIG. 3B shows a 16-QAM signal constellation after ICA processing in accordance with the present invention.

A preferred ICA algorithm is the Fast-ICA algorithm, which was used to generate the ICA processed signals in FIGS. 3B and 4B. However, any ICA separation algorithm may be used to effectively generate W.

In addition to the number of samples M per received symbol, the quality of the de-mixing matrix produced by ICA improves with the number of symbols Y used by ICA because each additional set of samples derived from a different symbol provides more statistical information about the unknown variables of the mixture. For example, the number of sampled received symbols Y used for the signal separation of a received symbol is preferably on the order of 100 or 1000 symbols. However, the actual value may be selected based on the amount of memory in the receiver and/or other communication and receiver limitations.

The estimates of each transmitted symbol is then derived by multiplying the de-mixing matrix W with the M I and Q samples of the corresponding received symbol according to:

$$\begin{bmatrix} i_L \\ q_L \end{bmatrix} = W \times \begin{bmatrix} x_I[n] \\ \vdots \\ x_I[n+M-1] \\ x_Q[n] \\ \vdots \\ x_Q[n+M-1] \end{bmatrix} \quad \text{Equation (13c)}$$

As shown in Equation (13c), using the ICA solution derived W matrix provides an estimate for the $I_k$ and $Q_k$ sequences of Equation (12). In particular, the $I_0$ and $Q_0$ sequences provide the receiver estimate of the transmitted symbol of the current symbol period. The other elements provide less accurate estimates of shifted versions of $I_0$ and $Q_0$.

Figure 4A:
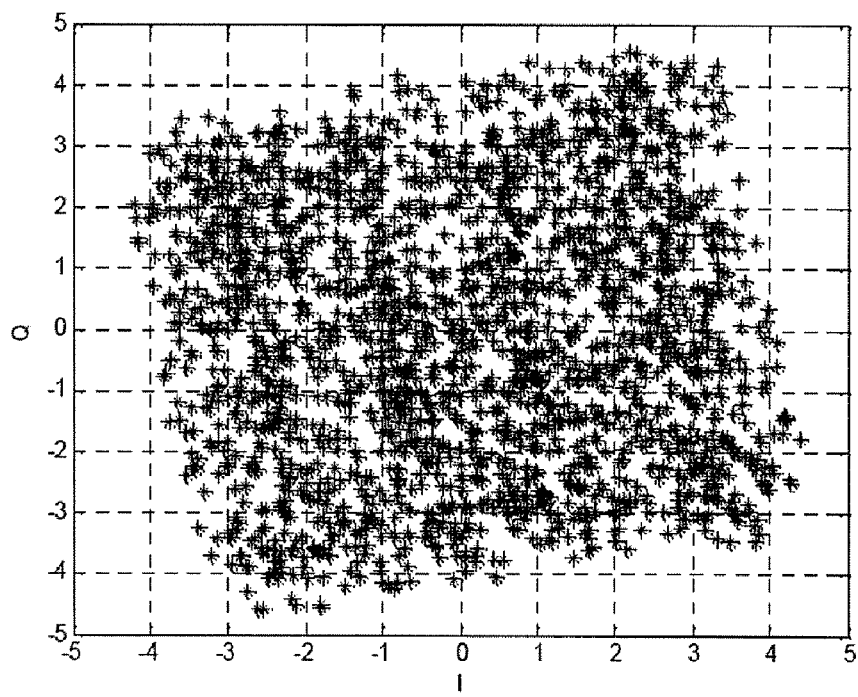
FIG. 4A shows 16-QAM signal constellation with carrier phase offset and other imperfections prior to ICA processing.
Figure 4A:
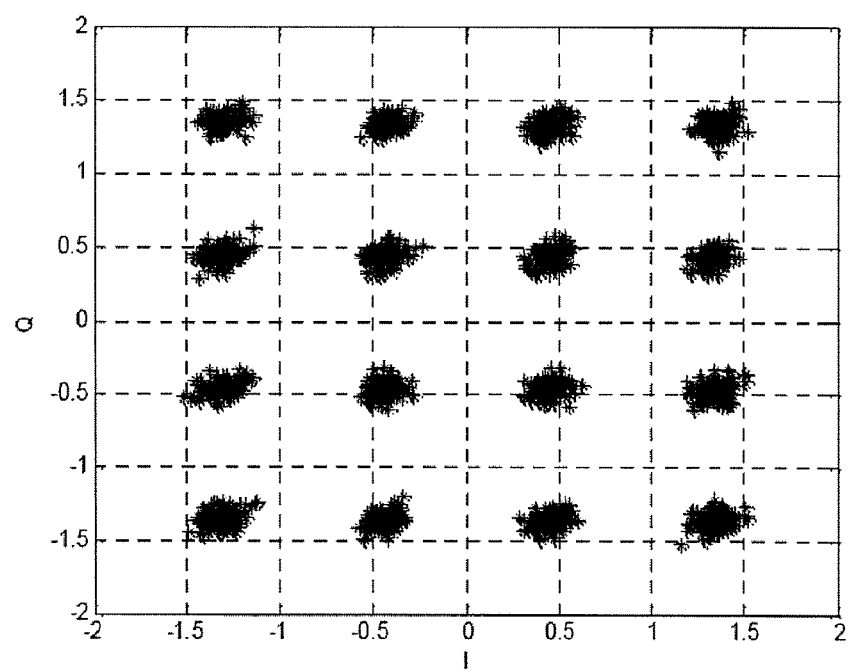

FIG. 3A shows 16-QAM signal constellation prior to the ICA processing, and FIG. 3B shows 16-QAM signal constellation after ICA processing in accordance with the present invention. FIG. 4A shows 16-QAM signal constellation with carrier phase offset and other imperfections, and FIG. 4B shows 16-QAM signal constellation after imperfections removed by the ICA processing in accordance with the present invention.

In the interest of comparison and according to the dimension of the $i_L$ and $q_L$ vectors in Equation (13), the present ICA-based equalization solution using M=2L+1 samples per symbol can be compared to a solution for a non-blind (2L+1)-tap linear equalizer. In other words, interference from the 2L adjacent symbols is considered in finding the ICA de-mixing solution. As is the case for linear equalizers, the performance quality of the present equalizer method is proportional to the number of interfering symbols considered in the equalization of a particular symbol, such that considering more symbols improves the performance of the ICA signal separation algorithm.

Figure 5:
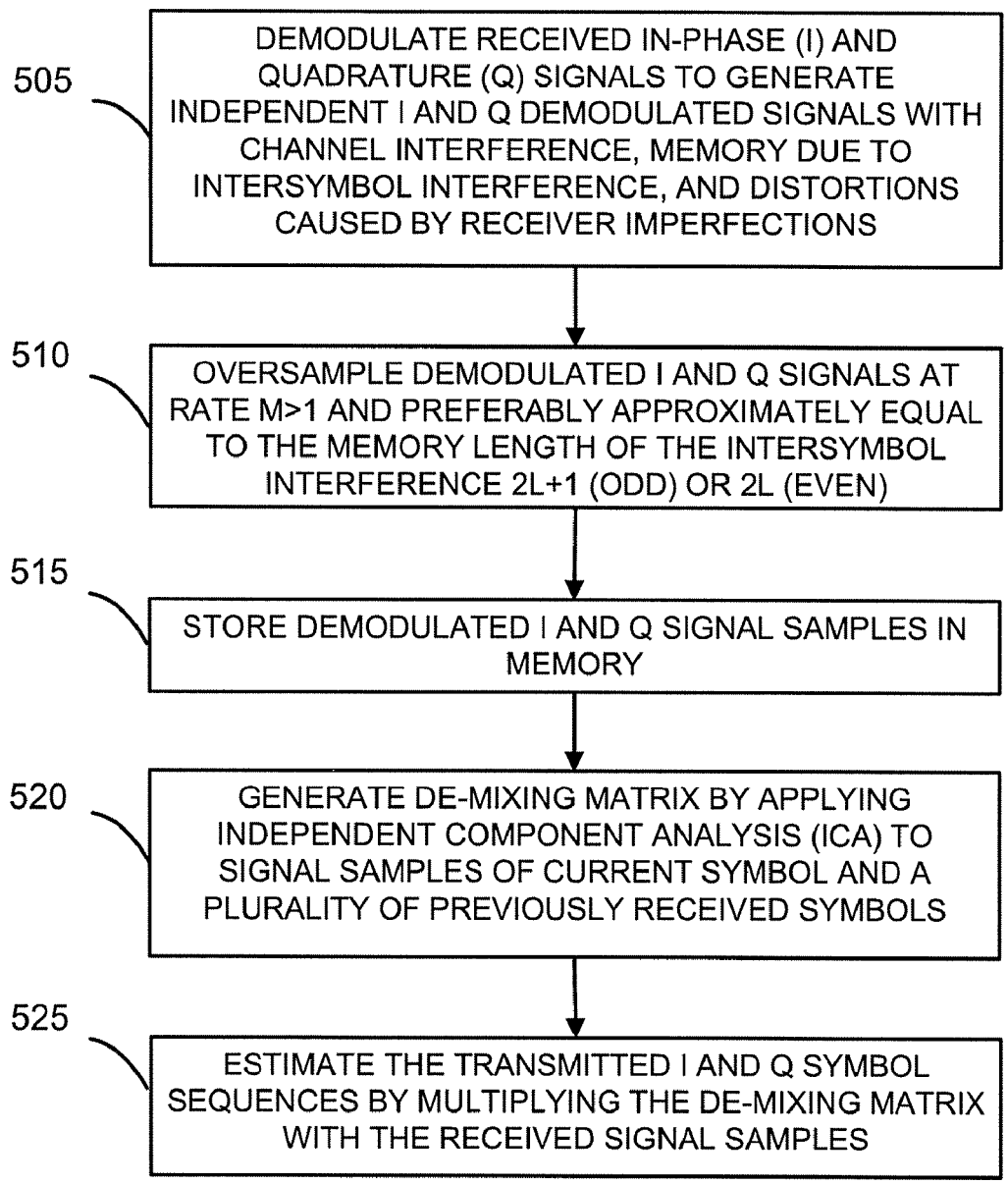
FIG. 5 is a flow diagram for ICA-based equalization and receiver imperfection compensation in accordance with the present invention.

FIG. 5 generally illustrates a method for ICA-based equalization in the time domain with receiver imperfection correction in accordance with a preferred embodiment of the present invention. In particular, the method of FIG. 5 is described with respect to a quadrature amplitude modulation (QAM) receiver. In step 505, received in-phase (I) and quadrature (Q) signals are demodulated by an imperfect receiver such that the demodulated I and Q signals are a function of transmitter pulse shaping, channel impulse response, and receiver imperfections which may include DC offset, I/Q phase imbalance, I/Q amplitude imbalance and carrier frequency and phase offsets. Such quantities are assumed to be unknown, but constant.

The demodulated I and Q signals are preferably oversampled at a rate of M times the symbol rate of the transmitted signal, where M>1, in step 510, and preferably at a rate approximately equal to the memory length of intersymbol interference 2L (even) or 2L+1 (odd). In step 515, the I and Q signal samples are stored in memory so that the recovery of the transmitted symbol can be cast as a signal separation problem that can be solved by independent component analysis (ICA).

In step 520, ICA is applied to the stored I and Q samples of the current received symbol and a plurality of previously received symbols to produce a de-mixing matrix W. Deterministic components of the mixture including DC offsets are inherently removed in the pre-processing of ICA in step 520. Finally, in step 525, the originally transmitted I and Q symbol sequences are estimated by multiplying the de-mixing matrix with the samples of the current received symbol. In particular, an estimate of the current received symbol is provided.

The above described invention may be implemented, by way of example, as an integrated circuit, such as an application specific integrated circuit (ASIC), or a digital signal processor. Such implementations may be included in a wireless transmit/receive unit (WTRU) or a base station. A wireless transmit/receive unit (WTRU) includes but is not limited to a user equipment, mobile station, fixed or mobile subscriber unit, pager, or any other type of device capable of operating in a wireless environment. A base station includes but is not limited to a Node-B, site controller, access point or any other type of interfacing device in a wireless environment.

The present invention also is related to the physical layer (digital baseband) and can be used in any communication system employing digital receivers. The features of the present invention may be incorporated into an integrated circuit (IC) or be configured in a circuit comprising a multitude of interconnecting components.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any integrated circuit, and/or a state machine.

A processor in association with software may be used to implement a radio frequency transceiver for use in a wireless transmit receive unit (WTRU), user equipment, terminal, base station, radio network controller, or any host computer. The WTRU may be used in conjunction with modules, implemented in hardware and/or software, such as a camera, a videocamera module, a videophone, a speakerphone, a vibration device, a speaker, a microphone, a television transceiver, a handsfree headset, a keyboard, a Bluetooth module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for equalizing a received signal that includes a plurality of symbols having a predetermined symbol rate, the method comprising:
   demodulating the received signal to generate an in-phase (I) signal and a quadrature (Q) signal;
   sampling the I signal and the Q signal at a sampling rate that is at least twice the predetermined symbol rate to generate a plurality of I signal samples and a corresponding plurality of Q signal samples per symbol;
   generating a de-mixing matrix by applying independent component analysis (ICA) in a time domain to the generated I and Q signal samples; and
   generating an estimate of a symbol in the plurality of symbols by multiplying the de-mixing matrix with the generated I and Q signal samples.

2. The method of claim 1 wherein the generating of the de-mixing matrix includes applying the ICA to matrix columns of the generated I and Q signal samples such that the de-mixing matrix is an approximation of an inverse of a mixing matrix where each column matrix is equivalent to the mixing matrix multiplied by respective transmitted I symbol and Q symbol plus an offset.

3. The method of claim 1 wherein the sampling includes over-sampling at the sampling rate that is a multiple of the predetermined symbol rate where the multiple is equal to the number of the I signal samples generated per symbol.

4. The method of claim 1 wherein the demodulating includes generating an I signal and a Q signal for each of a plurality of signals received by a plurality of antennas, and the sampling comprises sampling each of the I and Q signals.

5. The method of claim 4 wherein the sampling comprises over-sampling such that the sampling rate is a multiple of the predetermined symbol rate.

6. The method of claim 1 further comprising storing the I and Q signal samples.

7. The method of claim 6 wherein the generating of the de-mixing matrix is performed using a Fast-ICA algorithm applied to the stored I and Q signal samples.

8. A receiver for equalizing a received signal including a plurality of symbols having a predetermined symbol rate comprising:
- a demodulator configured to demodulate the received signal to generate an in-phase (I) signal and a quadrature (Q) signal;
- a sampler configured to sample the I signal and the Q signal at a sampling rate that is at least twice the predetermined symbol rate to generate a plurality of I signal samples and a corresponding plurality of Q signal samples per symbol; and
- a processor configured to generate a de-mixing matrix by applying independent component analysis (ICA) in a time domain to the generated I and Q signal samples, and to generate an estimate of a symbol in the plurality of symbols by multiplying the de-mixing matrix with the generated I and Q signal samples.

9. The receiver of claim 8 wherein the processor configured to generate the de-mixing matrix by applying the ICA to matrix columns of the generated I and Q signal samples such that the de-mixing matrix is an approximation of an inverse of a mixing matrix where each column matrix is equivalent to the mixing matrix multiplied by respective transmitted I symbol and Q symbol plus an offset.

10. The receiver of claim 8 wherein the sampler configured to over-sample such that the sampling rate is a multiple of the predetermined symbol rate where the multiple is equal to the number of the I signal samples generated per symbol.

11. The receiver of claim 8 further comprising:
- a plurality of antennas configured to receive a plurality of signals wherein the demodulator is configured to generate the I signals and the Q signals for each of the plurality of signals and the sampler is configured to sample each of the I and Q signals.

12. The receiver of claim 8 wherein the sampler is configured to over-sample at the sampling rate that is a multiple of the predetermined symbol rate.

13. The receiver of claim 8 further comprising a memory configured to store the I and Q signal samples.

14. The receiver of claim 13 wherein the processor configured to use a Fast-ICA algorithm applied to the stored I and Q signal samples to generate the de-mixing matrix.

15. A wireless transmit/receive unit (WTRU) comprising the receiver of claim 8.

16. A base station comprising the receiver of claim 8.

* * * * *